US010855938B2

(12) United States Patent
Larsen

(10) Patent No.: US 10,855,938 B2
(45) Date of Patent: *Dec. 1, 2020

(54) GAZE TRACKING VARIATIONS USING SELECTIVE ILLUMINATION

(71) Applicant: Sony Interactive Entertainment Inc., Tokyo (JP)

(72) Inventor: Eric J. Larsen, Pacifica, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,254

(22) Filed: Aug. 5, 2019

(65) Prior Publication Data

US 2019/0364228 A1 Nov. 28, 2019

Related U.S. Application Data

(63) Continuation of application No. 15/713,466, filed on Sep. 22, 2017, now Pat. No. 10,375,326, which is a continuation of application No. 14/493,738, filed on Sep. 23, 2014, now Pat. No. 9,781,360.

(60) Provisional application No. 61/881,660, filed on Sep. 24, 2013.

(51) Int. Cl.
*H04N 5/33* (2006.01)
*H04N 5/235* (2006.01)
*G06K 9/00* (2006.01)
*G06K 9/20* (2006.01)

(52) U.S. Cl.
CPC ........... *H04N 5/33* (2013.01); *G06K 9/00604* (2013.01); *H04N 5/2351* (2013.01); *H04N 5/2354* (2013.01); *G06K 9/2027* (2013.01)

(58) Field of Classification Search
None
See application file for complete search history.

(56) References Cited

U.S. PATENT DOCUMENTS

| 5,016,282 | A | 5/1991 | Tomono et al. |
|---|---|---|---|
| 5,016,643 | A | 5/1991 | Applegate et al. |
| 7,722,230 | B2 | 5/2010 | Chien |
| 7,922,330 | B2 | 4/2011 | Saarloos |
| 8,538,636 | B2 * | 9/2013 | Breed ................. E05F 15/43 |
| | | | 701/49 |

(Continued)

FOREIGN PATENT DOCUMENTS

WO 0133282 5/2001

OTHER PUBLICATIONS

Amended claim set.*

(Continued)

*Primary Examiner* — Mohammad J Rahman
(74) *Attorney, Agent, or Firm* — JDI Patent; Joshua Isenberg; Robert Pullman

(57) ABSTRACT

Aspects of the present disclosure relate to eye tracking systems and methods which track eyes by illuminating the eyes using a light source and detecting the eye illuminations using a sensor. Implementations of the present disclosure may utilize wide angle lighting via a plurality of individual light sources which are each oriented in different orientations. A wide area may be illuminated by the different light sources, and these light sources may be selectively turned on and off based on a current location of a user.

20 Claims, 6 Drawing Sheets

(56) References Cited

U.S. PATENT DOCUMENTS

| | | |
|---|---|---|
| 9,468,373 B2 | 10/2016 | Larsen |
| 9,480,397 B2 | 11/2016 | Larsen |
| 2002/0051116 A1 | 5/2002 | Saarloos et al. |
| 2005/0100191 A1 | 5/2005 | Harbach et al. |
| 2008/0186449 A1 | 8/2008 | Sur et al. |
| 2009/0196460 A1 | 8/2009 | Jakobs et al. |
| 2010/0039618 A1 | 2/2010 | Lemos |
| 2010/0245767 A1* | 9/2010 | Chao ............... A61B 3/113 351/210 |
| 2010/0292676 A1 | 11/2010 | Larsen |
| 2011/0006978 A1 | 1/2011 | Yuan |
| 2011/0069277 A1 | 3/2011 | Blixt et al. |
| 2011/0109880 A1 | 5/2011 | Nummela |
| 2012/0086801 A1 | 4/2012 | Larsen |
| 2012/0105486 A1 | 5/2012 | Lankford et al. |
| 2012/0155703 A1 | 6/2012 | Hernandez-Abrego et al. |
| 2012/0257035 A1 | 10/2012 | Larsen |
| 2012/0327642 A1 | 12/2012 | Chien |
| 2013/0096863 A1 | 4/2013 | Liu et al. |
| 2013/0321265 A1 | 12/2013 | Bychkov et al. |
| 2014/0055747 A1 | 2/2014 | Nistico et al. |
| 2014/0168401 A1 | 6/2014 | Bruijn et al. |
| 2014/0247232 A1 | 9/2014 | George-Svahn et al. |
| 2015/0085097 A1 | 3/2015 | Larsen |
| 2015/0208019 A1 | 7/2015 | Stewart et al. |
| 2018/0013960 A1 | 1/2018 | Larsen |

OTHER PUBLICATIONS

European Extended Search Report dated Mar. 28, 2017 for Application 14849903.1.

Final Office Action for U.S. Appl. No. 14/493,738, dated Sep. 21, 2016.
International Search Report and Written Opinion for International Application No. PCT/US2014/056998, dated Dec. 18, 2014.
International Search Report and Written Opinion for International Application No. PCT/US2014/057003, dated Dec. 4, 2014.
International Search Report and Written Opinion for International Application No. PCT/US2014/057006, dated Jan. 22, 2015.
Non-Final Office Action for U.S. Appl. No. 14/193,723, dated Mar. 4, 2016.
Non-Final Office Action for U.S. Appl. No. 15/713,466, dated Oct. 1, 2018.
Non-Final Office Action for U.S. Appl. No. 14/493,738, dated Jun. 6, 2016.
Non-Final Office Action for U.S. Appl. No. 14/493,766, dated Dec. 31, 2015.
Non-Final Office Action for U.S. Appl. No. 14/493,766, dated May 26, 2016.
Non-Final Office Action for U.S. Appl. No. 14/493,723, dated Sep. 15, 2015.
Notice of Allowance for U.S. Appl. No. 14/493,738, dated Apr. 24, 2017.
Notice of Allowance for U.S. Appl. No. 15/295,915, dated Jan. 4, 2018.
Notice of Allowance for U.S. Appl. No. 15/713,466, dated Mar. 19, 2019.
U.S. Appl. No. 61/881,656, to Eric J. Larsen, filed Sep. 24, 2013.
U.S. Appl. No. 61/881,660, to Eric J. Larsen, filed Sep. 24, 2013.
U.S. Appl. No. 61/882,662, to Eric J. Larsen, filed Sep. 24, 2013.

* cited by examiner

GAZE TRACKING VARIATIONS USING SELECTIVE ILLUMINATION

CLAIM OF PRIORITY

This application is a continuation of U.S. patent application Ser. No. 15/713,466, filed Sep. 22, 2017, the entire contents of which are incorporated herein by reference. U.S. patent application Ser. No. 15/713,466 is a continuation of U.S. patent application Ser. No. 14/493,738, filed Sep. 23, 2014, the entire disclosures of which are incorporated herein by reference. U.S. patent application Ser. No. 14/493,738 claims the priority benefit of U.S. provisional patent application No. 61/881,660 filed Sep. 24, 2013, the entire disclosures of which are incorporated herein by reference.

CROSS REFERENCE TO RELATED APPLICATIONS

This application is related to U.S. patent application Ser. No. 14/493,723 (now U.S. Pat. No. 9,468,373), filed Sep. 23, 2014, the entire contents of which are herein incorporated by reference.

This application is related to commonly-assigned, co-pending U.S. patent application Ser. No. 14/493,766 (now U.S. Pat. No. 9,480,397), filed Sep. 23, 2014, the entire contents of which are herein incorporated by reference.

FIELD

The present disclosure relates to eye gaze tracking. In particular, aspects of the present disclosure relate to light sources for optical eye gaze tracking systems.

BACKGROUND

Eye gaze tracking has use in a wide range of applications, including medical research, automobile technology, computer entertainment and video game programs, control input devices, augmented reality glasses, and more.

Some known eye gaze tracking techniques involve illuminating the eyes by emitting light from one or more light sources and detecting reflections of the emitted light off of the eyes with a sensor. Typically, this is accomplished using invisible light sources in the infrared range and capturing image data (e.g., images or video) of the illuminated eyes with an infrared sensitive camera. Image processing algorithms are then used to analyze the image data to determine eye gaze direction.

Generally, eye tracking image analysis takes advantage of characteristics distinctive to how light is reflected off of the eyes to determine eye gaze direction from the image. For example, the image may be analyzed to identify eye location based on corneal reflections in the image data, and the image may be further analyzed to determine gaze direction based on a relative location of the pupils in the image.

Two common gaze tracking techniques for determining eye gaze direction based on pupil location are known as Bright Pupil tracking and Dark Pupil tracking. Bright Pupil tracking involves illumination of the eyes with a light source that is substantially in line with the optical axis of the camera, causing the emitted light to be reflected off of the retina and back to the camera through the pupil. The pupil presents in the image as an identifiable bright spot at the location of the pupil, similar to the red eye effect which occurs in images during conventional flash photography. Dark Pupil tracking involves illumination with a light source that is substantially off line from the optical axis of the camera, causing light directed through the pupil to be reflected away from the optical axis of the camera, resulting in an identifiable dark spot in the image at the location of the pupil.

In order to effectively determine the desired eye gaze characteristics (e.g., eye position, gaze direction, and the like), these tracking techniques generally rely on the tracking system's ability to effectively illuminate the user's eyes with the light source and effectively detect the corresponding reflections of the emitted light off of these eyes. However, geometric parameters such as the location of the user with respect to the tracking system sensor and with respect to the light sources of the tracking system can be highly variable, changing with different system setups and even different instances of use of the same tracking system setup.

It would be desirable to have an eye tracking system capable of illuminating eyes and capturing corresponding eye illuminations in a manner that accounts a variety of different geometric parameters. Unfortunately, there is no way to efficiently do so using traditional techniques. It is within this context that aspects of the present disclosure arise.

SUMMARY

An implementation of the present disclosure may include a method comprising: emitting light from an eye tracking device, wherein said emitting the light includes initially emitting the light from a plurality of light sources of the eye tracking device, each said light source being oriented to emit light at a different angle; detecting an area illuminated by the light with a sensor of the eye tracking device; identifying one or more of the light sources as contributing light sources from analysis of data gathered from said detecting the area, said identifying the light sources as the contributing light sources being based on a determination that the contributing light sources illuminate one or more eyes; and turning off the light sources not identified as the contributing light sources, wherein said emitting the light further includes, after said turning off the light sources, emitting the light from the contributing light sources, and wherein said detecting the area includes, after said turning off the light sources, detecting an area illuminated by the light from the contributing light sources.

Another implementation of the present disclosure may include a system comprising: an eye tracking device having a sensor and a plurality of light sources, each said light source being oriented to emit light at a different angle; and a computing device, wherein the system is configured to perform a method, the method comprising: emitting light from the eye tracking device, wherein said emitting the light includes initially emitting the light from the plurality of light sources; detecting an area illuminated by the light with the sensor; identifying, with the computing device, one or more of the light sources as contributing light sources from analysis of data gathered from said detecting the area, said identifying the light sources as the contributing light sources being based on a determination that the contributing light sources illuminate one or more eyes; and turning off the light sources not identified as the contributing light sources, wherein said emitting the light further includes, after said turning off the light sources, emitting the light from the contributing light sources, and wherein said detecting the area includes, after said turning off the light sources, detecting an area illuminated by the light from the contributing light sources.

A non-transitory computer readable medium having processor-executable instructions embodied therein, wherein execution of the instructions by a processor causes the processor to perform a method, the method comprising: emitting light from an eye tracking device, wherein said emitting the light includes initially emitting the light from a plurality of light sources of the eye tracking device, each said light source being oriented to emit light at a different angle; detecting an area illuminated by the light with a sensor of the eye tracking device; identifying one or more of the light sources as contributing light sources from analysis of data gathered from said detecting the area, said identifying the light sources as the contributing light sources being based on a determination that the contributing light sources illuminate one or more eyes; and turning off the light sources not identified as the contributing light sources, wherein said emitting the light further includes, after said turning off the light sources, emitting the light from the contributing light sources, and wherein said detecting the area includes, after said turning off the light sources, detecting an area illuminated by the light from the contributing light sources.

BRIEF DESCRIPTION OF THE DRAWINGS

The teachings of the present disclosure can be readily understood by considering the following detailed description in conjunction with the accompanying drawings, in which.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Eye tracking devices may utilize a lighting apparatus to illuminate eyes, and a sensor to detect the illuminated eyes. The eye tracking data gathered by the sensor may then be analyzed to determine the desired eye gaze characteristics, such as eye position, eye movements, gaze direction, gaze point, and the like. It would be desirable for an eye tracking device to be able illuminate eyes in a wide variety of positions with respect to the tracking device. Unfortunately, providing a wide area of illumination with an eye tracking device using traditional techniques would prove inefficient and consume a significant amount of power.

Implementations of the present disclosure may overcome these and other drawbacks by providing a wide area of illumination using a tracking device which as a plurality of light sources oriented to emit light at different angles. Each differently oriented light source may illuminate an additional area so that the tracking device may illuminate one or more users in a wide variety of positions with respect to the tracking device. Furthermore, these light sources may be selectively turned off based on which light sources are providing the illumination of the user. In yet further aspects, the position of the user may be tracked in real-time so that the light sources may be dynamically turned on and off based upon present user position.

These and further aspects of the present disclosure will be apparent upon consideration of the following detailed description of various implementation details and their accompanying drawings.

Implementation Details

Figure 1:
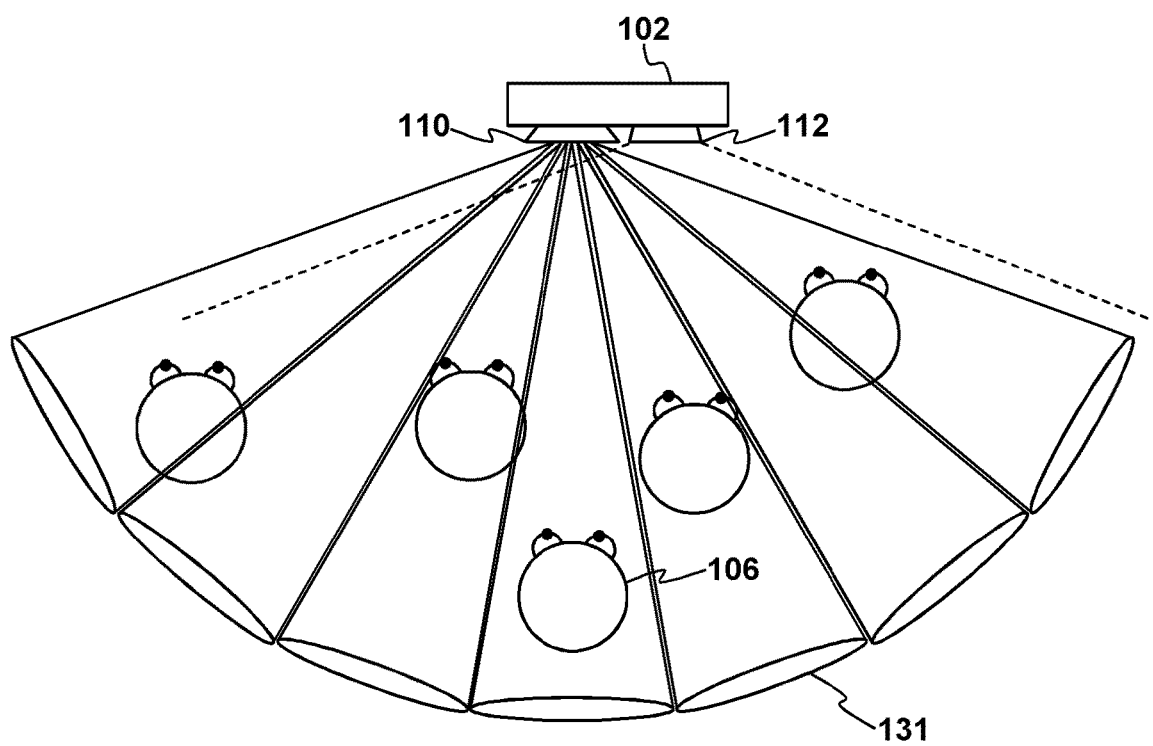
FIG. 1 is a schematic diagram depicting an example eye tracking device in accordance with various aspects of the present disclosure.

An illustrative example of a system for eye tracking is depicted in FIG. 1. The example system 100 includes an eye tracking device 102 which has a wide-angle lighting apparatus 110 and a sensor 112 that is sensitive to light emitted from the lighting apparatus 110. In the implementation depicted in FIG. 1, the wide-angle lighting apparatus 110 has a plurality of individual light sources, each of which may be oriented to emit light in a different direction. Each of the light sources may emit a cone of illumination 131, and each of the illumination cones 131 may be projected outward in a different direction to cover a different area of the operating environment so that the cones are collectively capable of illuminating a wide area. Depending on the nature of the lighting apparatus 110 some of the illumination cones may at least partially overlap with each other.

One or more sensors 112 of the eye tracking device 102 may be configured to detect light reflected from an area encompassed by the illumination cones 131 in order to detect the eyes of a user 106 whose eyes are illuminated by the lighting apparatus 110. As shown in FIG. 1, the user 106 may occupy a wide variety of positions relative to the tracking device 102 and still have eyes illuminated by the lighting apparatus 110 for eye tracking purposes, due to the wide area encompassed by the illumination cones 131. The example system 100 may also include a display device (not pictured) which may operate in coordination with the eye tracking device 102 for various eye tracking applications, e.g., to determine a user's gaze point on the screen.

In one example, the wide angle lighting apparatus 110 of the eye tracking device 102 may include a plurality of light sources, e.g., in the form of light-emitting diodes (LEDs), such as infrared LEDs which actively emit visible or non-visible light, and each of the LEDs may be fixed to a casing of the eye tracking device 102 (or lighting apparatus 110) in a different relative orientation. By way of example, the sensor 112 may be a camera, such as an infrared camera, which may also be fixed to the casing of the eye tracking device 102 in an orientation that facilitates image capture of some or all of the area encompassed by the cones of illumination 131.

In the illustrative example depicted in FIG. 1, the eye tracking device 102 may be used to gather eye tracking data by emitting light from the wide-angle lighting apparatus 110 to illuminate the eyes of a user 106, and detecting reflections of the emitted light with the sensor 112. The sensor data may be analyzed to determine one or more gaze characteristics of the user, such as eye position, eye movements, gaze direction, gaze point, and the like, based on eye illuminations contained in the sensor data. For example, this may involve analyzing the images captured with the sensor 112 to identify eye illuminations, including corneal reflections caused by the emitted light and/or one or more Dark Pupils (i.e. a dark spot at a pupil location of an eye illuminated by light that is off-axis from the camera 112). These characteristic eye illuminations in the images may be analyzed to determine the desired gaze characteristics using a computing device configured to process the images in accordance with eye tracking image processing algorithms.

In the example depicted in FIG. 1, each of the cones 131 may be non-overlapping or substantially non-overlapping so as to minimize the amount of light sources needed to illuminate a user 106 at any given time, thereby conserving power. However, it will be appreciated that cones having some overlap may also be used in other implementations, in which case two or more light sources may be illuminating a user at any given time.

FIGS. 2A-2D depict an example process flow of an eye tracking technique using a system 200 similar to the system 100 depicted in FIG. 1.

Figure 2A:
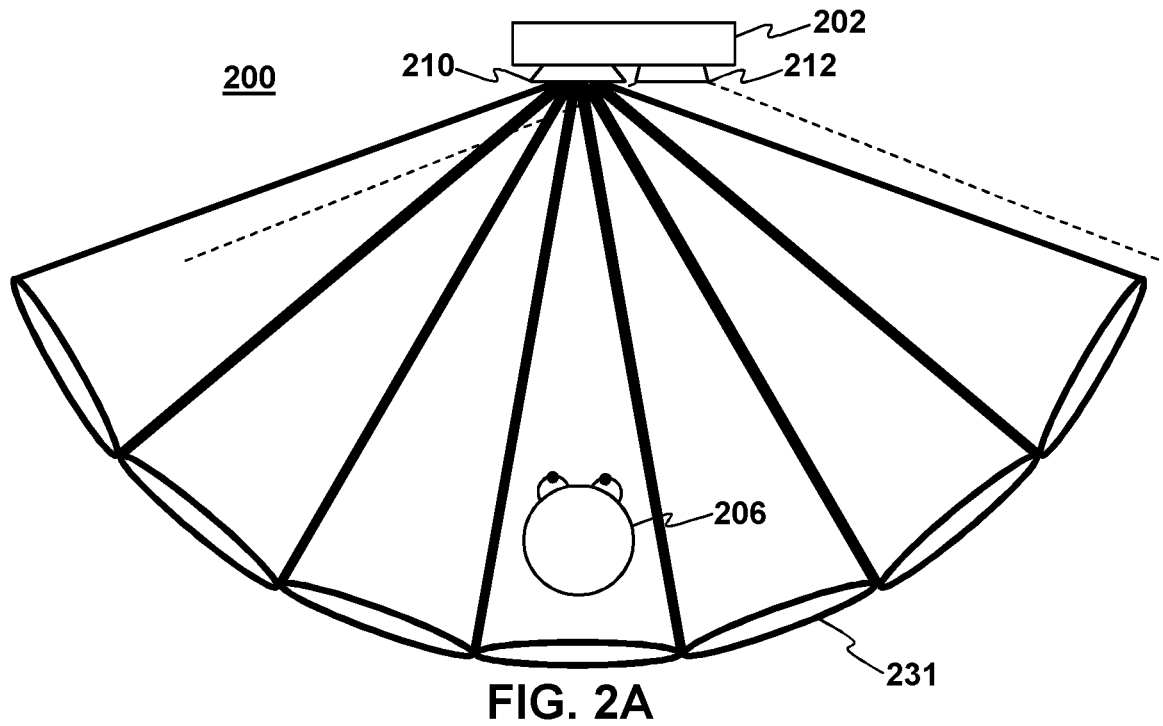
FIGS. 2A-2D is a process flow diagram depicting and example a method of eye tracking in accordance with various aspects of the present disclosure.

As shown in FIG. 2A, an eye tracking technique may include emitting light from a wide angle lighting apparatus 210 in order to illuminate the eyes of a user 206. The wide angle lighting apparatus 210 may include a plurality of light sources oriented in different directions, and each of the light sources may produce a cone of illumination 231.

As illustrated in FIG. 2A, the eye tracking technique may involve initially illuminating an area using all (or most) of the light sources of the wide angle lighting apparatus 210 so that a wide area is initially illuminated. The area illuminated by the lighting apparatus 210 may be detected by a sensor 212 of the eye tracking device 202, e.g., by capturing images of an area illuminated by the lighting apparatus 210. As a result of the wide area of illumination provided by the plurality of light sources, a user's eyes located anywhere within the cones of illumination 231 may be illuminated and tracked with the eye tracking device 202, giving the system flexibility for a wide variety of system setups and adaptability to a wide variety of user positions.

Figure 2B:
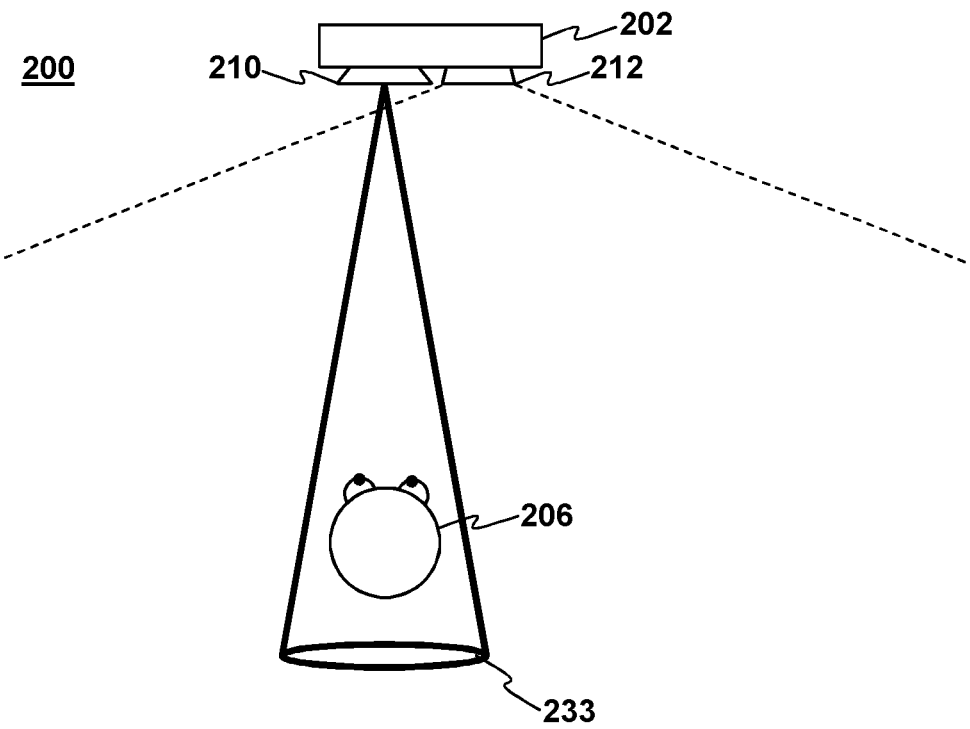

After initially illuminating the area using all or most of the light sources of the wide angle lighting apparatus 210, the system 200 may then selectively turn off one or more of the initially illuminated light sources while selectively leaving on or more of the initially illuminated light sources. As shown in FIG. 2B, light sources that are not contributing to illumination of the user can be turned off, e.g., to conserve power, while the one or more light sources 233 that do contribute to illumination of the user 206 may selectively stay on.

In one implementation, this may be accomplished by analyzing the data gathered with the sensor 212 to determine which of the light sources is contributing to the illumination of the user's eyes. For example, the sensor 212 may capture infrared images of the user 206 and analyze the images in order to determine which of the light sources are contributing to the illumination of the user's eyes and providing useful eye illuminations for the data gathered with the sensor 212. By way of example, this analysis may be accomplished by identifying one or more users within the images, e.g., using facial recognition or recognition of the characteristic eye illuminations to identify a presence of illuminated eyes, and estimating a relative location of the identified user with respect to the eye tracking device 202. The user's location within the images may then be correlated with a known relative orientation of the light sources with respect to the camera 212 in order to determine of which of the light sources corresponds with the user's location within the image. These light sources may be identified as one or more "contributing light sources" for the eye tracking system so that they can be kept on to illuminate the user 206 while tracking the users eyes, and the remaining light sources may be turned off, as depicted in FIG. 2B.

In another example, the contributing light sources 233 may be identified using some other known information about the tracking device 202 and its lighting apparatus 210. For example, each of the light sources may be pulsed on and off at a different known pulse frequencies. Images captured during the pulsing of the light may be analyzed to detect a presence of reflections of sufficient intensity at one or more of these known frequencies and/or a presence of reflections at an identified location of a user at one or more of the known pulse frequencies. If light in the emitted wavelength/wavelength range at any of these frequencies are present in the images, the frequency may be correlated to the known frequencies of the individual light sources to determine which of the light sources should be identified as a contributing light source 233. Alternatively, each of the lighting apparatus 210 may include a plurality of light sources that emit light of different corresponding frequencies, e.g., a different infrared frequency for each light source. The tracking device may include a camera that can distinguish these different frequencies and produce corresponding images. Images captured with the camera may be analyzed to detect a presence of reflections of sufficient intensity at one or more of these known frequencies at an identified location of a user. By correlating the frequencies of light illuminating the user's face in the image to the corresponding known frequencies emitted by the light sources of the lighting apparatus 210 may determine which of the light sources should be identified as a contributing light source 233.

Figure 2C:
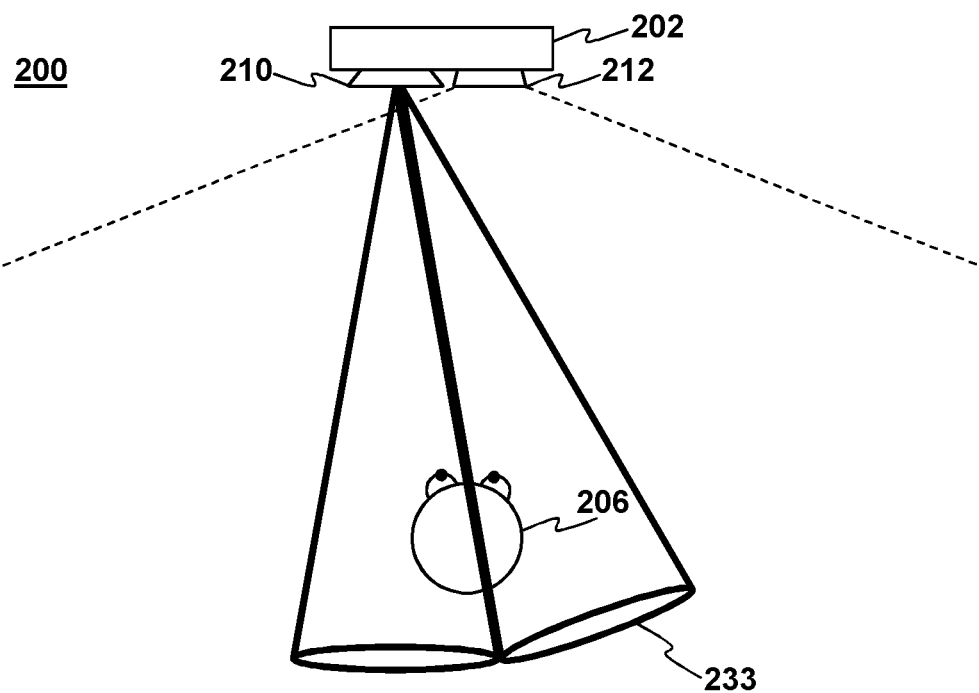
Figure 2D:
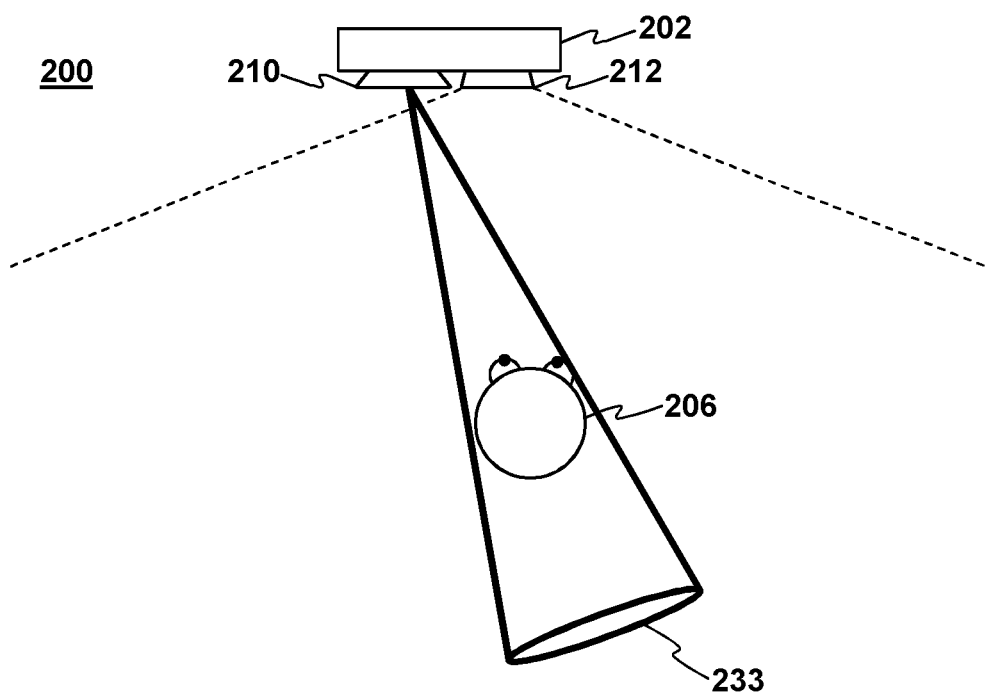

Turning to FIGS. 2C-2D, the system 200 may be configured to dynamically adjust in real-time which light sources are currently used emit light 233, e.g., to account for changes in position of the user 206. For example, as shown in FIG. 2C, the user has changed positions with respect to the tracking device, affecting the illumination provided by the previously identified contributing light source of FIG. 2B. The system 200 may react, e.g., on the fly, by turning on one or more of the other light sources to sufficiently illuminate the user's eyes for the eye tracking device 202.

In the situation depicted in FIG. 2C, it may be desirable to keep more than one of the light sources on in order to properly illuminate the user's eyes, due to the user's position at a border (or region of overlap) between two or more of the cones of illumination 233 provided by the contributing light sources.

As shown in FIG. 2D, the system may continue to adjust to the user's currently position by turning off the previous contributing light sources in order to further conserve power based on the user's current position.

It is noted that the system 200 may be configured to adjust dynamically to the present location of the user in a variety of ways.

In one implementation, the system may be configured to continuously or periodically analyze data gathered with the eye tracking device 202 in order to detect changes relevant to the user's position and relevant to the sufficiency of the illumination provided by the currently on light source(s) 233.

For example, the system 200 may detect that the illumination being currently provided is insufficient based on a decrease in the system's ability to track eyes and/or gather data containing eye illuminations, or by the eye tracking cutting out. Upon a determination that the illumination being provided by the currently illuminated light source(s) is no longer sufficient, the system may, in one example, turn on all of the light sources and repeat a process similar to the initial process described above with respect to FIGS. 2A-2B in order to re-identify the currently contributing light source. In another example, the system 200 may instead turn on only one or more of the light sources which are adjacent to the previously identified contributing light sources, because the insufficiency may be due to a small movement outside of the illumination cone of the previously contributing light sources and into a cone corresponding to one of the adjacent light sources.

By way of further example, the system may analyze the sensor data to determine which light sources should be turned on in order to account for the user's movement. For example, as the user 206 moves around, the images of the user may be analyzed to determine the user's relative movement with respect to the tracking device, including the light sources, and the user's movement may be correlated with corresponding LEDs of the dynamic lighting apparatus 210. As a simple example, if analysis of one or more images captured with the sensor 212 indicates that the user 206 is moving in a leftward direction with respect to the tracking device 202, the system may be configured to turn a light source adjacent to the currently on light source in a leftward orientation relative to the presently on light source.

In yet another example, an additional sensor may be included with the eye tracking device to identify a relative location of one or more users to the eye tracking device 202.

In yet other implementations, a conventional lighting control technique to the system of 200 in order to provide illumination of the eyes of the user 206.

It is noted that the differently oriented light sources may be fixed in different orientations in order to avoid a need for some complex mechanical or other optical system for providing illumination of a wide possibility of angles, thereby providing a relatively reliable, efficient, and low cost solution. Any of a variety of different geometric configurations and techniques may be used so that a plurality of light sources emit light in different directions.

For example, in the implementations depicted in FIGS. 1 and 2, each of the different light sources of the wide angle lighting apparatus 110, 210 may be fixed in a different orientation with respect to a casing of the eye tracking device, and it will be appreciated that a variety of different configurations may be used.

Figure 3A:
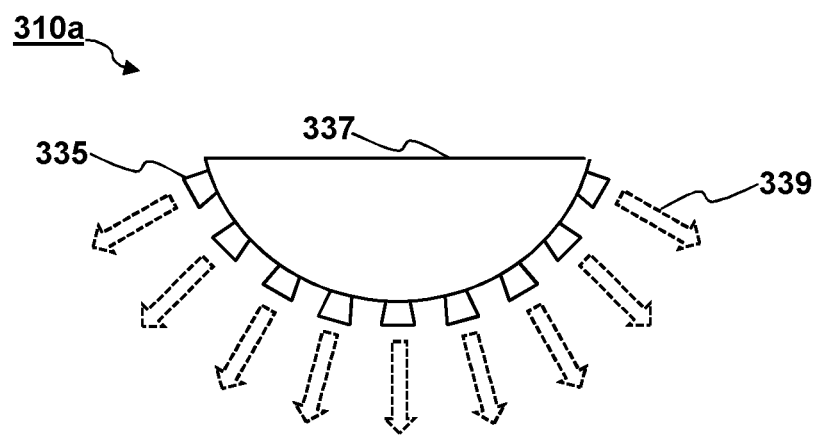
FIGS. 3A-3B are schematic diagrams of eye tracking devices having different configured light sources in accordance with various aspects of the present disclosure.

By way of example, and not by way of limitation, one possible implementation of a wide angle lighting apparatus 310a is depicted in FIG. 3A. The example lighting apparatus 310a has a plurality of individual light sources 335, each of which is fixed in a different relative orientation. In the example depicted in FIG. 3A, each individual light source 335 may be an infrared LED, and the LEDs may be fixed to a casing component 337 having a convex surface. Each LED 335 may be disposed in an orientation that is normal to the convex surface of the casing component 337 at a different location, resulting in each of the discrete light sources 335 emitting light 339 outward in a different direction.

Figure 3B:
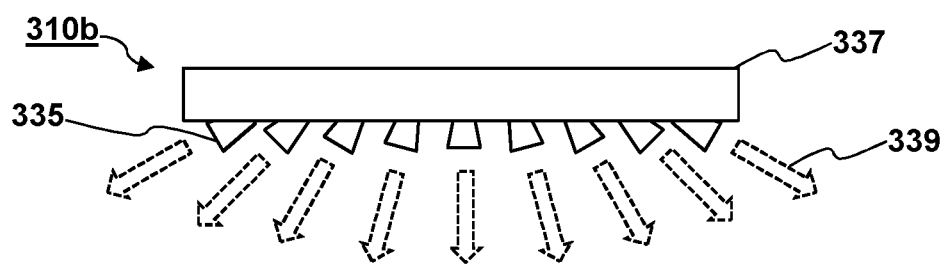

By way of further non-limiting example, another wide angle lighting apparatus 310b is depicted in FIG. 3B. In the example depicted in FIG. 3B, light sources 335 are configured to emit light 339 in the same directions depicted in the example of FIG. 3A, but the light sources are fixed in a planar or substantially planar configuration, rather than being fixed to a convex surface. In one example, the casing component 337 of FIG. 3B may be a horizontal bar.

It is noted that a wide variety of geometric configurations are possible. For example, the individual light sources may be configured to cover a horizontal area, such as by being oriented in different horizontal directions (i.e. horizontal with respect to the ground). In yet further examples, the individual light sources may be configured to cover a wide vertical area, such as wide vertical direction (i.e. vertical with respect to the ground). In yet further examples, the light sources may be configured to cover a wide area in both horizontal and vertical directions using light sources oriented in both different horizontal angles and different vertical angles, such as by being disposed on a surface of a spherical casing component with each emitting light at an outward direction normal to the surface.

It is further noted that the lighting apparatus may include one or more light sources configured to emit light in the same orientation, so long as there is a plurality of light sources which each emit light at different orientations.

Figure 4:
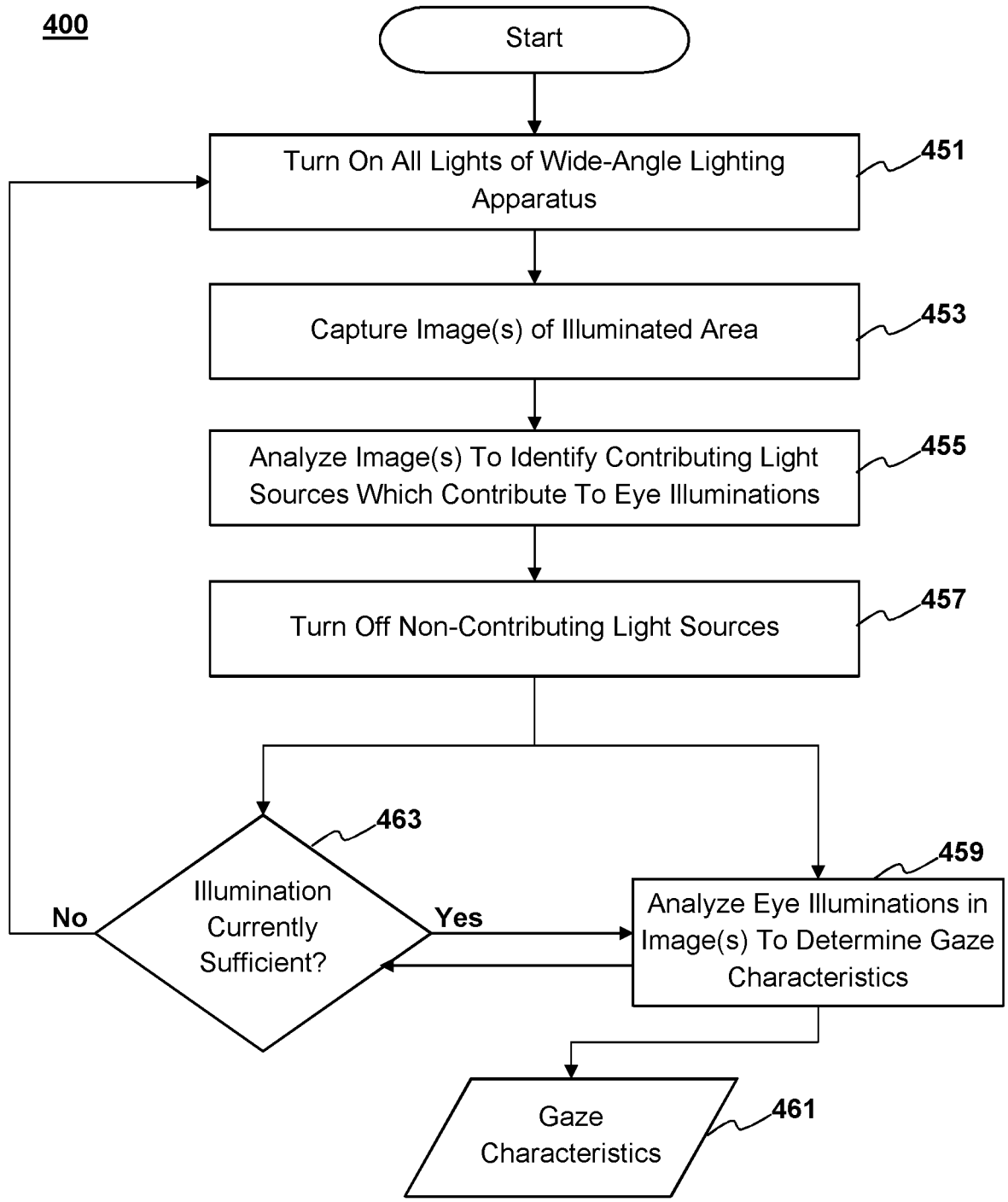
FIG. 4 is a flow diagram of an example method of eye tracking in accordance with various aspects of the present disclosure.

FIG. 4 illustrates a flow diagram depicting an example eye tracking method 400 in accordance with various aspects of the present disclosure. By way of example, some or all of the method 400 may be performed by a computing device coupled which is configured to receive data from a sensor of an eye tracking device and/or send control outputs to a lighting apparatus of the eye tracking device, and the method 400 may have similarities to the method depicted in FIGS. 2A-2D.

The method 400 may involve initially emitting light from all light sources of a plurality of light sources of an eye tracking device. This may include, e.g., turning on all of the light sources 451 of an eye tracking device which has a plurality of light sources, each of which may be oriented to emit light in a different direction. For example, the lighting apparatus may be similar to the lighting apparatus 210 of FIG. 2A, and the lights may emit cones of illumination which a wide area as depicted in FIG. 2A. It is noted that the system may be configured to initially emit light automatically from all of the light sources, e.g., when powered on by a user, or a computing device may be configured to turn on the lights by sending a control signal which powers on all of the lights.

An area illuminated by emitted light may then be detected with a sensor of the eye tracking device. This may involve capturing images 453 of an area illuminated by the wide angle lighting apparatus of the eye tracking device using a camera that is sensitive to the light emitted from the lighting apparatus. By way of example, and not by way of limitation, the emitted light may be infrared light, and the images captured may be infrared images captured with an infrared sensitive camera of the eye tracking device.

The eye tracking data gathered from the detection of the illuminated area may be analyzed to determine which light sources may be providing useful light for eye tracking purposes and which of the light sources are not. The data may be analyzed to identify one or more of the light sources 455 as "contributing light sources" in which case the remaining light sources may be designated "non-contributing light sources." A user whose eyes are being tracked may be positioned in only one or more of the cones of illumination provided by the light sources, e.g., as shown in FIG. 2B, and one or more light sources providing the cone or cones of illumination in which the user is located may be identified from correspondence between the eye tracking data and known orientations of the light sources. For example, images gathered with the eye tracking device may be analyzed to determine a relative location of illuminated eyes within the images (e.g. using facial recognition techniques or recognition of eye illuminations contained in the images). The relative location of the user/user's eyes within the images may be correlated to a known orientation of one or more of the light sources in order to determine which of the light sources are contributing to eye illuminations used for eye tracking.

The method 400 may then involve turning off one or more of the light sources 457 not identified as contributing light sources. For example, a computing device performing the analysis of the images may send a control output to the eye tracking device which causes the selected light sources to be turned off, such as shown in FIGS. 2A-2B. After turning off the non-contributing light sources 457, the sensor data may continue to be analyzed in order to track one or more eyes by determining gaze characteristics from analysis of the eye illuminations 459 caused by emitting light from the identified contributing light source. By way of example, this may involve analyzing one or more infrared images to determine one or more gaze characteristics, such as eye position, eye movements, gaze direction, gaze point, or a combination thereof, using a Dark Pupil or Bright Pupil tracking algorithm executed by the computing device. The method 400 may output one or more gaze characteristics 461, e.g., for a computer application incorporating eye tracking features, from the analysis of the illuminated eyes.

The method 400 may also involve dynamically adjusting a currently on light source in real-time, e.g. as shown and described above in FIGS. 2C-2D and accompanying disclosure. By way of example, this may involve continuously or periodically determining whether or not the illumination provided by the current light source is sufficient 463 to illuminate the eyes being tracked. For example, if the eye illuminations in the sensor data weak or cut out, or if user motion is detected from analysis of the images, it may be determined that the current illumination is not sufficient and that the lighting apparatus should be adjusted. This may involve turning on some or all of the other light sources, i.e. the previously turned off light sources, as described above with respect to FIGS. 2A-2D. In the example illustrated in FIG. 4, all of the light sources are turned on again, and the initial process used to identify the contributing light source is repeated; however, but it is understood that other variations are possible.

Figure 5:
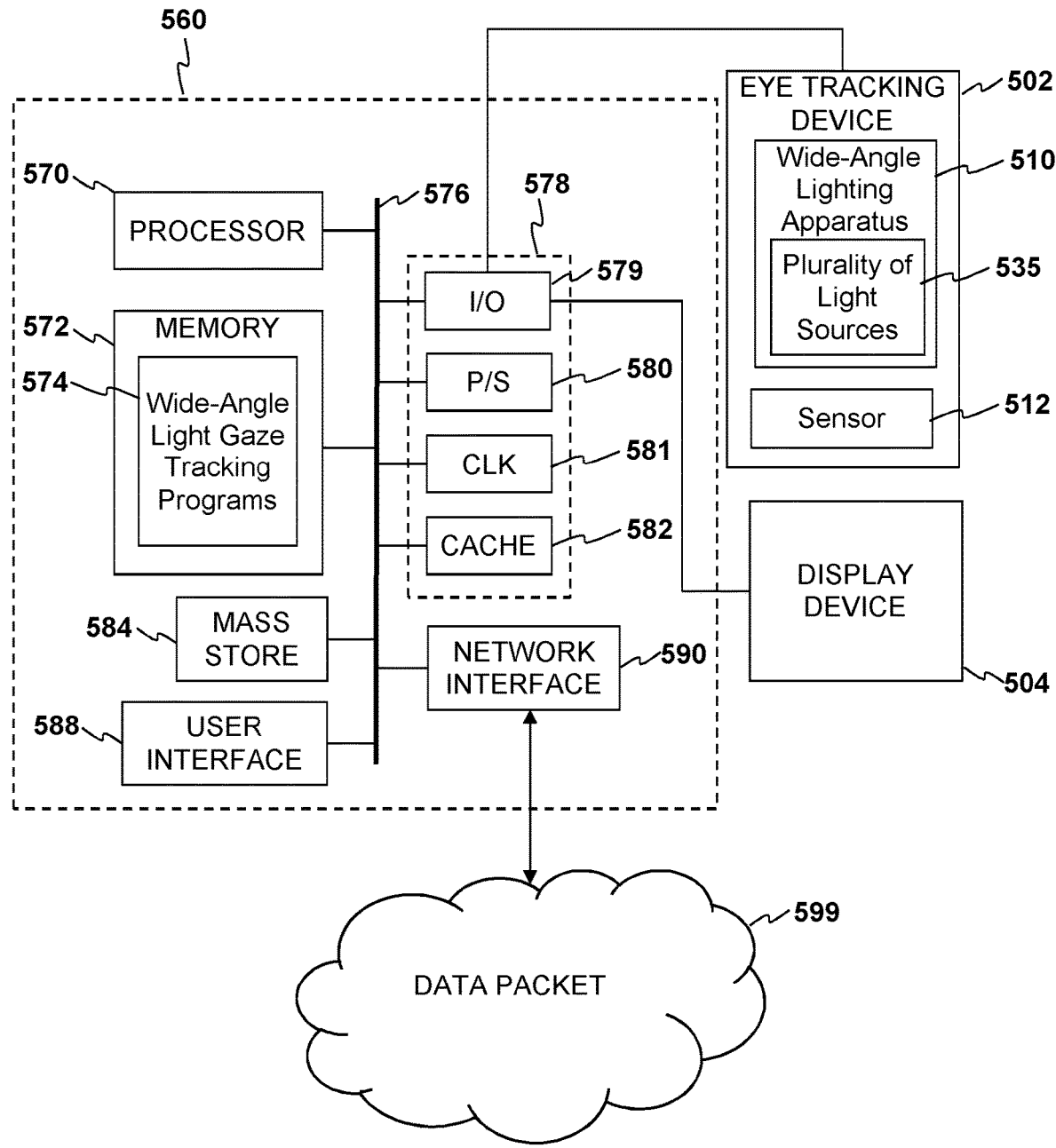
FIG. 5 is a block diagram depicting an example system for eye tracking in accordance with various aspects of the present disclosure.

FIG. 5 depicts an example system for eye tracking 500 to further illustrate various aspects of the present disclosure. The example system 500 may include a computing device 560 which is coupled to an eye tracking device 502 and a display device 504 in order to perform eye gaze tracking and/or calibration for eye tracking in accordance with aspects of the present disclosure.

The display device 586 may be in the form of a cathode ray tube (CRT), flat panel screen, touch screen, or other device that displays text, numerals, graphical symbols, or other visual objects. According to aspects of the present disclosure, the computing device 560 may be an embedded system, mobile phone, personal computer, tablet computer, portable game device, workstation, game console, and the like. Moreover, the computing device 560, the eye tracking device 502, the display device 504, or any combination thereof may form an integral unit or be implemented as separate components which may be in communication with each other.

The eye tracking device 502 may be coupled to the computing device 560, and may include a wide angle lighting apparatus 510, which may be similar to lighting apparatus 210 of FIGS. 2A-2D. By way of example, and not by way of limitation, the lighting apparatus 510 may be in the form of a plurality of infrared LEDs 535, each of which may be electronically controllable by the computing device 560 to turn on and off, e.g. as described above with respect to FIG. 4, and which may be configured to illuminate a user's eyes in order to gather eye tracking data with the sensor 512. The sensor 512 of the eye tracking device may be a detector which is sensitive to light emitted from the lighting apparatus 510. For example, the sensor 512 may be a camera sensitive to the light source such as an infrared camera, and the camera 512 may be positioned relative to the eye tracking device and the lighting apparatus so that it may capture images of an area illuminated by the lighting apparatus 510.

The computing device 560 may be configured to operate in coordination with the eye tracking device 502 and the display device 504, in order to perform eye gaze tracking and determine lighting conditions in accordance with aspects of the present disclosure. The computing device 560 may include one or more processor units 570, which may be configured according to well-known architectures, such as, e.g., single-core, dual-core, quad-core, multi-core, processor-coprocessor, cell processor, and the like. The computing device 560 may also include one or more memory units 572 (e.g., RAM, DRAM, ROM, and the like).

The processor unit 570 may execute one or more programs, portions of which may be stored in the memory 572, and the processor 570 may be operatively coupled to the memory 572, e.g., by accessing the memory via a data bus 576. The programs may be configured to perform eye gaze tracking and determine lighting conditions for the system 500. By way of example, and not by way of limitation, the programs may include wide angle light gaze tracking programs 574, execution of which may cause the system 500 to perform a method having one or more features in common with the method 400 of FIG. 4. By way of example, and not by way of limitation, the gaze tracking programs 574 may include processor executable instructions which cause the system 500 to determine one or more gaze tracking characteristics from eye tracking data gathered with the camera 512 while light is emitted from the lighting apparatus 510. The gaze tracking programs 574 may also include instructions which analyze images gathered with the camera 512 in order to determine which light source out of the plurality of light sources 535 is currently contributing to eye illuminations, e.g., as described above with respect to FIG. 4.

The computing device 560 may also include well-known support circuits 578, such as input/output (I/O) circuits 579, power supplies (P/S) 580, a clock (CLK) 581, and cache 582, which may communicate with other components of the system, e.g., via the bus 576. The computing device 560 may also include a mass storage device 584 such as a disk drive, CD-ROM drive, tape drive, flash memory, or the like, and the mass storage device 584 may store programs and/or data. The computing device 560 may also include a user interface 588 to facilitate interaction between the system 500 and a user. The user interface 588 may include a keyboard, mouse, light pen, game control pad, touch interface, or other device.

The input/output components 579 may also include a controller which interfaces with the eye tracking device 502 in order to control the of the lighting apparatus 510, e.g. based on the image analysis of the gaze tracking programs 574. The system 500 may also execute one or more general computer applications (not pictured), such as a video game, which may incorporate aspects of eye gaze tracking as sensed by the tracking device 502 and processed by the tracking programs 574.

The computing device 560 may include a network interface 590, configured to enable the use of Wi-Fi, an Ethernet port, or other communication methods. The network interface 590 may incorporate suitable hardware, software, firmware or some combination thereof to facilitate communication via a telecommunications network. The network interface 590 may be configured to implement wired or wireless communication over local area networks and wide area networks such as the Internet. The computing device 560 may send and receive data and/or requests for files via one or more data packets 599 over a network.

It will readily be appreciated that variations on the components depicted in FIG. 5 are possible, and that various ones of these components may be implemented in hardware, software, firmware, or some combination thereof. For example, the some features or all features of the calibration programs contained in the memory 572 and executed by the processor 570 may instead be implemented via suitably configured hardware, such as one or more application specific integrated circuits (ASIC) configured to perform some or all of a method in accordance with aspects of the present disclosure, such as method 400 of FIG. 4.

Conclusion

It is noted that aspects of the present disclosure have been described with reference to eye tracking devices that use infrared light sources, which has developed as a relatively standard light source for optical eye tracking techniques. However, it is understood that other implementations are possible. For example, in implementations of the present disclosure, other invisible light sources are possible, such as ultraviolet light. By way of further example, in implementations of the present disclosure, visible light sources are possible for eye illumination, although it may be desirable to use invisible light sources in order to avoid distracting a user.

It is further noted that aspects of the present disclosure have been described with reference to tracking the eye or eyes of a single user. However, it is understood that other implementations are possible, such as tracking the eyes of more than one user, and the technique can be adapted to account from differently positioned users simultaneously by emitting light outward at a plurality of different directions from a plurality of differently oriented light sources from the plurality of light sources.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "a", or "an" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. a) emitting light from an eye tracking device, wherein said emitting the light includes initially emitting the light from all light sources of a plurality of light sources of the eye tracking device, each said light source of the plurality being oriented to emit light at a different angle;

b) detecting an area illuminated by the light with a sensor of the eye tracking device;

identifying one or more of the light sources of the plurality as contributing light sources from analysis of data gathered from said detecting the area, said identifying the light sources as the contributing light sources being based on a determination that the contributing light sources illuminate one or more eyes, wherein identifying one or more of the lights sources of the plurality as contributing light sources comprises pulsing one or more of the plurality at a different pulse frequency than a pulse frequency of the rest of the light sources of the plurality and detecting the presence of reflections at the different pulse frequency or the pulse frequency of the rest of the light sources of the plurality;

c) turning off one or more light sources of the plurality not identified as the contributing light sources while emitting the light from the contributing light sources; and subsequently repeating a), b), and c) one or more times.

2. The method of claim 1,
wherein the sensor is a camera,
wherein the data is one or more images, and
wherein said detecting the area includes capturing the images with the camera.

3. The method of claim 1,
wherein the sensor is a camera,
wherein the data is one or more images,
wherein said detecting the area includes capturing the images with the camera, and
wherein said identifying the contributing light sources includes identifying a location of one or more illuminated eyes within the images and identifying the contributing light sources based on correspondence between the location and known orientations of each said light source.

4. The method of claim 1,
wherein the sensor is a camera,
wherein the data is one or more images,
wherein said detecting the area includes capturing the images with the camera, and
wherein the method further comprises, after said turning off the light sources, analyzing the images to determine one or more gaze characteristics of the one or more eyes illuminated by said emitting the light.

5. The method of claim 1,
wherein each said light source is an infrared LED,
wherein the sensor is an infrared camera,
wherein the data is one or more infrared images, and
wherein said detecting the area includes capturing the infrared images with the infrared camera.

6. The method of claim 1, wherein said turning off the light sources includes sending a control signal to the eye tracking device which causes said turning off of the light sources.

7. A system comprising:
an eye tracking device having a sensor and a plurality of light sources, each said light source being oriented to emit light at a different angle; and
a computing device, wherein the system is configured to perform a method, the method comprising:
a) emitting light from the eye tracking device, wherein said emitting the light includes initially emitting the light from all light sources of the plurality of light sources;
b) detecting an area illuminated by the light with the sensor;
c) identifying, with the computing device, one or more of the light sources of the plurality as contributing light sources from analysis of data gathered from said detecting the area, said identifying the light sources of the plurality as the contributing light sources being based on a determination that the contributing light sources illuminate one or more eyes, wherein identifying one or more of the lights sources of the plurality as contributing light sources comprises pulsing one or more of the plurality at a different pulse frequency than a pulse frequency of the rest of the light sources of the plurality and detecting the presence of reflections at the different pulse frequency or the pulse frequency of the rest of the light sources of the plurality;

d) turning off one or more light sources of the plurality not identified as the contributing light sources while emitting the light from the contributing light sources; and subsequently repeating a), b), c) and d) one or more times.

8. The system of claim 7, wherein each said light source is an infrared LED.

9. The system of claim 7, wherein each said light source is an infrared LED, wherein each said infrared LED is fixed to a casing of the eye tracking device at a different angle, wherein each infrared LED is configured to emit light in a different non-overlapping region in front of the eye tracking device.

10. The system of claim 7,
wherein the sensor is a camera,
wherein the data is one or more images, and
wherein said detecting the area includes capturing the images with the camera.

11. The system of claim 7,
wherein the sensor is a camera,
wherein the data is one or more images,
wherein said detecting the area includes capturing the images with the camera, and
wherein said identifying the contributing light sources includes identifying a location of one or more illuminated eyes within the images and identifying the contributing light sources based on correspondence between the location and known orientations of each said light source.

12. The system of claim 7,
wherein the sensor is a camera,
wherein the data is one or more images,
wherein said detecting the area includes capturing the images with the camera, and
wherein the method further comprises, after said turning off the light sources, analyzing the images to determine one or more gaze characteristics of the one or more eyes illuminated by said emitting the light.

13. The system of claim 7,
wherein each said light source is an infrared LED,
wherein the sensor is an infrared camera,
wherein the data is one or more infrared images, and
wherein said detecting the area includes capturing the infrared images with the infrared camera.

14. The system of claim 7, wherein said turning off the light sources includes sending a control signal from the computing device to the eye tracking device which causes said turning off of the light sources.

15. A non-transitory computer readable medium having processor-executable instructions embodied therein, wherein execution of the instructions by a processor causes the processor to perform a method, the method comprising:

a) emitting light from an eye tracking device, wherein said emitting the light includes initially emitting the light from all light sources of a plurality of light sources of the eye tracking device, each said light source being oriented to emit light at a different angle;

b) detecting an area illuminated by the light with a sensor of the eye tracking device;

identifying one or more of the light sources of the plurality as contributing light sources from analysis of data gathered from said detecting the area, said identifying the one or more light sources of the plurality as the contributing light sources being based on a determination that the contributing light sources illuminate one or more eyes, wherein identifying one or more of the lights sources of the plurality as contributing light sources comprises pulsing one or more of the plurality at a different pulse frequency than a pulse frequency of the rest of the light sources of the plurality and detecting the presence of reflections at the different pulse frequency or the pulse frequency of the rest of the light sources of the plurality;

c) turning off one or more light sources of the plurality not identified as the contributing light sources while emitting the light from the contributing light sources; and subsequently repeating a), b), and c) one or more times.

16. The non-transitory computer readable medium of claim 15,
wherein the sensor is a camera,
wherein the data is one or more images, and
wherein said detecting the area includes capturing the images with the camera.

17. The non-transitory computer readable medium of claim 15,
wherein the sensor is a camera,
wherein the data is one or more images,
wherein said detecting the area includes capturing the images with the camera, and
wherein said identifying the contributing light sources includes identifying a location of one or more illuminated eyes within the images and identifying the contributing light sources based on correspondence between the location and known orientations of each said light source.

18. The non-transitory computer readable medium of claim 15,
wherein the sensor is a camera,
wherein the data is one or more images,
wherein said detecting the area includes capturing the images with the camera, and
wherein the method further comprises, after said turning off the light sources, analyzing the images to determine one or more gaze characteristics of the one or more eyes illuminated by said emitting the light.

19. The non-transitory computer readable medium of claim 15,
wherein each said light source is an infrared LED,
wherein the sensor is an infrared camera,
wherein the data is one or more infrared images, and
wherein said detecting the area includes capturing the infrared images with the infrared camera.

20. The non-transitory computer readable medium of claim 15, wherein said turning off the light sources includes sending a control signal to the eye tracking device which causes said turning off of the light sources.

* * * * *